(12) United States Patent
Murali

(10) Patent No.: US 6,633,707 B1
(45) Date of Patent: Oct. 14, 2003

(54) LITHOGRAPHICALLY DEFINED OPTIC ARRAY

(75) Inventor: Venkatesan Murali, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 203 days.

(21) Appl. No.: 09/751,522

(22) Filed: Dec. 29, 2000

(51) Int. Cl.$^7$ ................................................ G02B 6/26
(52) U.S. Cl. ........................................ 385/52; 219/635
(58) Field of Search ........................... 385/50–52, 14, 385/15, 18, 24, 39, 49, 45, 130, 36, 88–94; 219/635, 603, 616, 677, 651, 632; 364/488, 489, 490, 491; 395/500.02–500.16; 174/250

(56) References Cited

U.S. PATENT DOCUMENTS

| | | | |
|---|---|---|---|
| 5,671,315 A | * | 9/1997 | Tabuchi et al. ............. 385/137 |
| 5,717,803 A | * | 2/1998 | Yoneda et al. ................ 385/89 |
| 5,719,978 A | * | 2/1998 | Kakii et al. .................. 385/50 |
| 6,049,638 A | * | 4/2000 | Norimatsu et al. ............ 385/14 |
| 6,097,884 A | * | 8/2000 | Sugasawara ................... 716/4 |
| 6,219,484 B1 | * | 4/2001 | Rhee et al. .................. 385/137 |
| 6,243,518 B1 | * | 6/2001 | Lee et al. ..................... 385/54 |
| 6,288,376 B1 | * | 9/2001 | Tsumura ..................... 219/635 |
| 6,343,171 B1 | * | 1/2002 | Yoshimura et al. ........... 385/50 |
| 6,396,995 B1 | * | 5/2002 | Stuelpnagel et al. ......... 385/115 |
| 2002/0027300 A1 | * | 3/2002 | Hartmann et al. ........... 264/1.1 |

* cited by examiner

Primary Examiner—Akm Enayet Ullah
(74) Attorney, Agent, or Firm—Blakely, Sokoloff, Taylor & Zafman LLP

(57) ABSTRACT

A two-dimensional lithographically defined optic array to transmit light through a substrates and aid alignment of multiple substrates. The 2-D lithographically defined optic array tan be made up of transparent material filled vias. Additionally, markers can be placed on the substrates relative to either the vias or the optical centers of the transparent material in the vias to aid alignment between multiple substrates containing 2-D lithographically defined optic arrays. Transparent materials such as optical fiber, cladding, and gas may be used in the 2-D optic array to provide a pathway for light. Optionally, a conductive layer may be deposited on a substrate with a 2-D optic array. The conductive layer can then interact with the 2-D optic array through light detecting devices such as photodetectors.

23 Claims, 4 Drawing Sheets

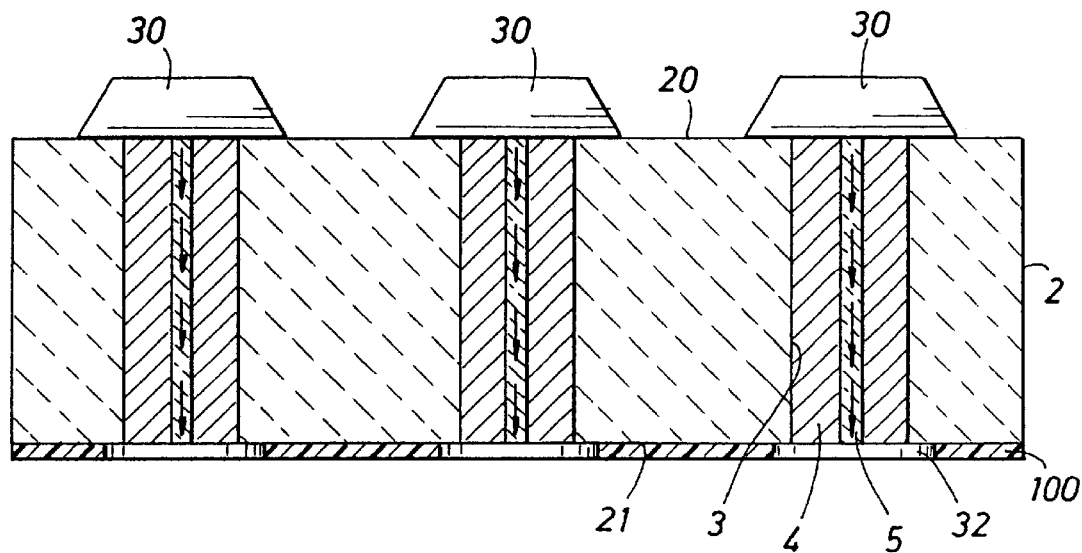
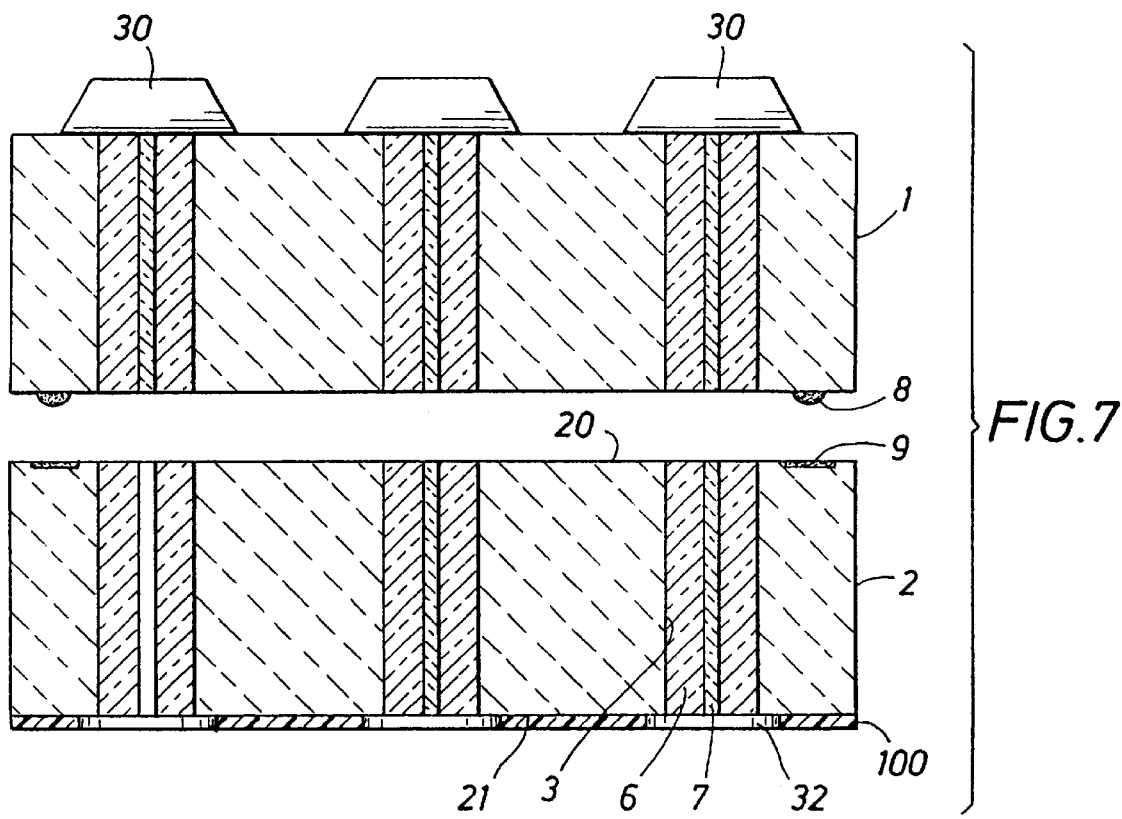

ns and Module (MCM) packages.

LITHOGRAPHICALLY DEFINED OPTIC ARRAY

FIELD OF THE INVENTION

The invention relates to optical circuits and in particular, two-dimensional (2-D) lithographically defined optical arrays.

BACKGROUND OF THE RELATED ART

Optical circuits provide many advantages over traditional electrical circuits. They are much faster and potentially much smaller than Controlled Collapse Chip Connector (C4) and Multi-Chip Module (MCM) packages. Optical circuits may also be used in conjunction with electronic MCMs.

Optical circuits typically use laser light transmitted by optical fiber. For example, many optical circuits use edge-emitting lasers (EELs) aligned with optical fiber lying in horizontal grooves on a substrate. This configuration of lasers and optical fiber requires significant area on an optical circuit substrate.

Optical fiber is typically composed of an outer layer and an inner core. The outer layer generally has a slightly lower refraction angle (index of refraction) than the inner core. The different refraction angle keeps light traveling in the centrally-aligned core. An end of each optical fiber is typically aligned on the substrate with an EEL. The other end of the optical fiber may be aligned with a photodetector. Typically, in manufacturing these optical circuits, optical fiber and EELs have to be aligned manually. This may take 30 to 40 minutes per alignment according to current techniques.

While EELs are capable of emitting many wavelengths of light and capable of emitting wavelengths in single and multi modes, they are difficult to manufacture and have high power requirements. Vertical Cavity Surface Emitting Lasers (VCSELs) are much easier to manufacture and have lower power requirements. While some VCSELs may only be able to emit a limited number of wavelengths in multi-mode emissions, they may be used to direct laser light signals in a vertical direction (i.e., orthogonal to the substrate).

Conventional products are difficult to align with a VCSEL and guide light vertically through one or more substrates with minimal dispersion losses.

BRIEF DESCRIPTION OF THE DRAWINGS

The invention is illustrated by way of example and not limitation in the accompanying figures:

FIG. 6 shows an embodiment of the invention having a substrate for a multi-level waveguide with polymer core/cladding filled vias.

FIG. 7 shows an embodiment of the invention having two substrates of a multi-level waveguide with optical fiber and a solder bump/metal pad alignment system.

DETAILED DESCRIPTION OF THE INVENTION

The following description makes reference to numerous specific details in order to provide a thorough understanding of the invention. However, it is to be noted that not every specific detail need be employed to practice the invention. Additionally, well-known details, such as particular materials or methods, have not been described in order to avoid obscuring the present invention.

Figure 1:
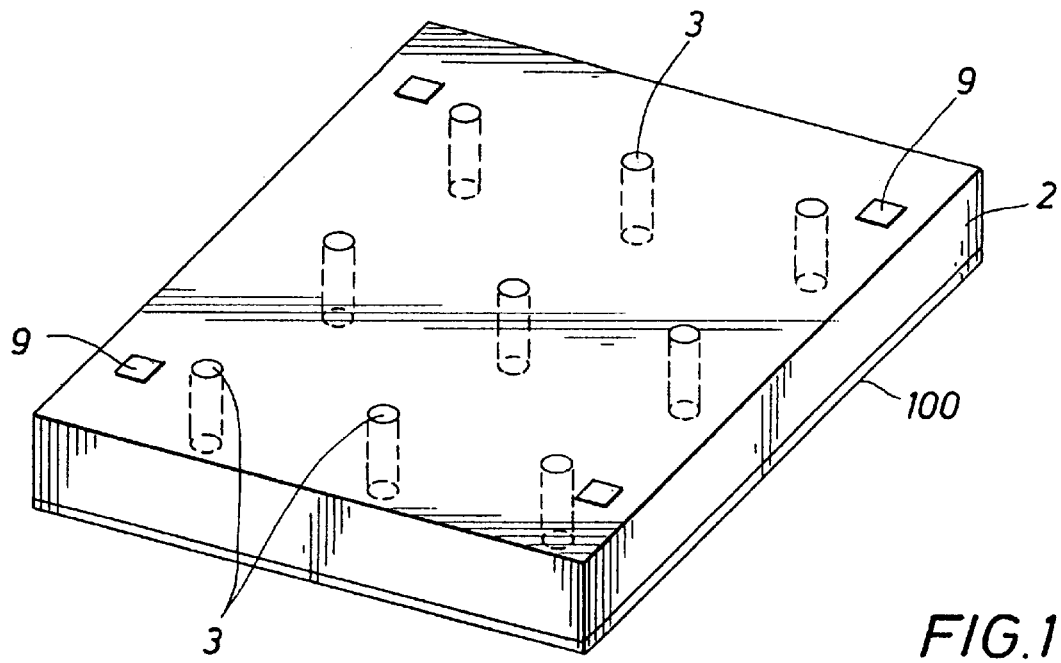
FIG. 1 shows a schematic, top perspective view of a two-dimensional (2-D) lithographically defined optic array according to an embodiment of the invention.

Referring to FIG. 1, an embodiment of the invention is shown in the form of a two-dimensional (2-D) optic array. In the embodiment shown in FIG. 1, a substrate having a two-dimensional array (xy dimensional array) of vias is formed therein. Vias 3 may include optically transmissive materials including, but not limited to, optical fiber, cladding, core/cladding, polymer, or gas. The 2-D optic array can be used to transmit light, or other forms of electromagnetic radiation, traveling between a top of substrate 2 (as shown) to a bottom of substrate 2 (as shown) in a primarily vertical direction or vice versa. The via array may be lithographically defined by markers 9 (e.g., fiducials) placed on the substrate to aid alignment between multiple optic arrays of similar configuration to that of substrate 2. Multiple optic arrays may thus be stacked to form multi-level optical arrays (e.g., waveguides).

A two-dimensional array of vias may be formed in substrate 2, in several different ways. For example, vias 3 may be formed using lithographic techniques where, for example, a photoimageable material is introduced over substrate 2 and patterned according to a designated mask pattern to define openings in the photoimageable material. Substrate 2 is then etched through the openings in the photoimageable material to form vias through substrate 2. Vias 3 may be etched in substrate 2 with a chemical etchant. Alternatively, vias 3 in substrate 2 may also be formed with a laser if the substrate comprises a material that is ablatable. The laser can be used to ablate vias 3 into substrate 2 according to a designated pattern.

Markers 9 are, in one embodiment, similar to markers (targets) used in photolithography operations. In one embodiment, one or more markers of a selected pattern is (are) introduced over the substrate. Alignment tools (such as, for example, contact aligners, proximity aligners, scanning projection aligners, steppers, and x-ray aligners) use these alignment markers to align a mask through which a photo-imageable material is defined. accordingly, in one embodiment, markers 9 are introduced on substrate 2 prior to the introduction of vias 3 and markers 9 are used to align a mask to locate vias 3 and form the array.

The width of vias 3 formed in substrate 2 of FIG. 1 may vary depending on the type of transparent material that is to be inserted. For example, if optical fibers are to be inserted into the two dimensional array of vias, the width of the via may be slightly smaller than the diameter of the optical fiber. For example, if the optical fiber has an outer diameter of 10 microns, the via may be on the order of 10 microns or may have a slightly smaller diameter in the event that the via is expanded upon subsequent exposure to a heat source. The height (thickness) of substrate 2 may also vary widely depending on the type and size of the substrate used. For example, substrate heights (thicknesses) may be in the range of approximately 100–600 microns, analogous, in one regard, to optical circuit substrates known in the art, although other heights (thicknesses) are within the scope of the invention. Suitable substrates for substrate 2 include, but are not limited to, a semiconductor substrate, a ceramic substrate, a multi-layer ceramic substrate, and a polymeric (e.g., a polyimide) substrate.

After formation, each via may be prepared by inserting optically transmissive material therein to transmit light from the top of substrate 2 (as shown) to the bottom of substrate 2 (as shown). For example, vias 3 may contain gas (such as argon or air). Alternatively, vias 3 may also have cladding and possibly core materials introduced therein. For example, a cladding material of silicon dioxide (e.g., a doped silicon dioxide) may be grown (and doped) along the side walls of each vias 3. An optically transmissive core with an index of refraction greater than the cladding may optionally then be introduced, such as a silicon dioxide material introduced by a plasma enhanced chemical vapor deposition (PECVD) process. As noted above and in a further alternative, each vias 3 may have an optical fiber. Other optically transmissive materials can also be used to transmit light through the via. In addition, instead of inserting a material, each via 3 may be subject to a vacuum.

Collectively, substrate 2 with vias 3 may representatively constitute a two-dimensional optical array. As noted above, two or more substrates such as substrate 2 may be assembled (e.g., stacked) into a three-dimensional (3-D) with the vias (e.g., vias 3) aligned for light transmission through multiple substrates.

Light traveling through optically transmissive material in vias 3 may be used to transmit data. It is generally recognized that the shorter the wavelength of the light traveling through a substrate array (such as substrate 2 and vias 3), the faster data can be transported through the array. However, shorter wavelength light will more easily disperse as it travels through irregularities in an optical array. If light disperses as it travels through the optical array, the data being transmitted may be lost.

While shorter wavelengths of light may result in faster data transmission speeds, shorter wavelength light is more likely to disperse when traveling between two substrates (e.g., between two substrates such as substrate 2). To minimize light dispersion between two adjacent substrates of an array, adjacent substrates may optically aligned. Referring to FIG. 1, markers 9 placed on the two-dimensional optical array with respect to the prepared vias or to the optical cores of the optically transmissive material inserted in the prepared vias, may also be used to align multiple substrates to form multi-level (e.g., three dimensional) arrays. In other words, markers 9 may be located consistently for a plurality of substrates that are to be assembled into a multi-level 3-D array. Using the same alignment tool and the same mask, vias of the various substrates can be aligned. Markers 9 may also be used to align the substrates together in a multi-dimensional array.

In addition to vias 3 and markers 9, substrate 2 may further include opto-electronic circuits (e.g., VCSELs, photodetectors, etc.), electronic circuits, and conductive material (e.g., interconnects), collectively represented as circuit layer 100 introduced to interact with light in the multi-level array. In this manner, a substrate may include an optical electronic integrated circuit (OEIC) for linking optical and electronic signals.

Figure 2:
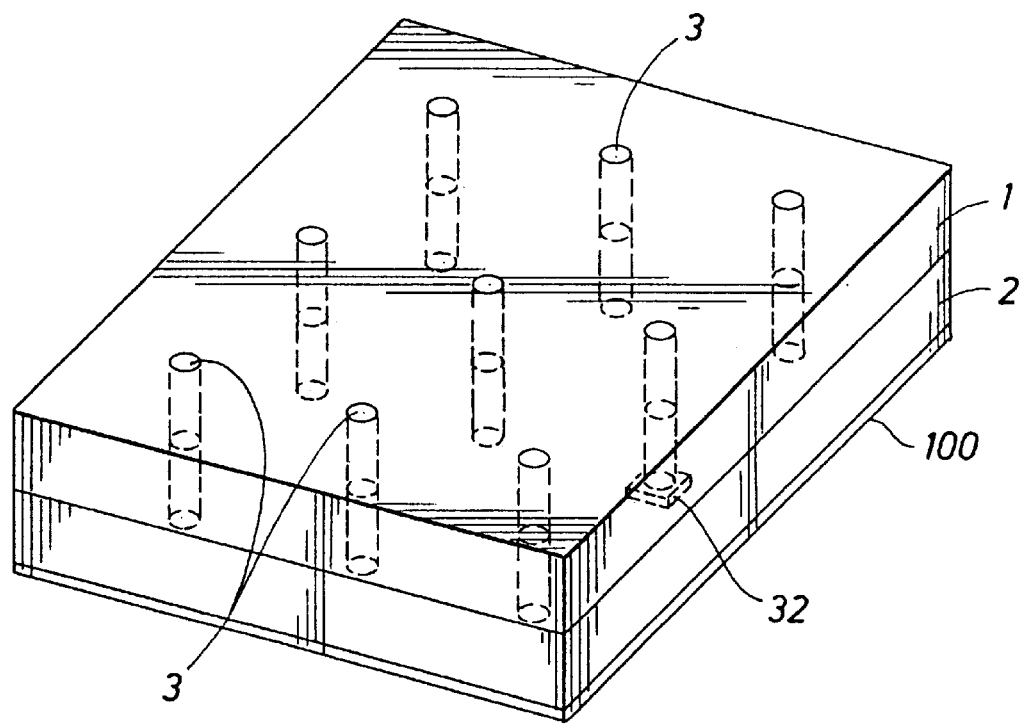
FIG. 2 shows an embodiment of the invention having a multi-level waveguide.

Referring to FIG. 2, an embodiment of the invention in the form of aligned substrates for a multi-level array (e.g., a three-dimensional array) is shown. Top substrate 1 (as shown) and bottom substrate 2 (as shown), each with a 2-D optical array of prepared vias are aligned and connected to form a continuous optical path. Circuit layer 100 may be introduced on the bottom of bottom substrate 2 (as shown). Circuit layer 100 may interact with the optical array through photodetectors 32 aligned with each prepared via 3 of the optic array where, for example, a light signal is converted to an electronic signal. Alternatively, a plurality of VCSELs may be aligned with substrate 2 to emit light signals through the three-dimensional array. In such case, circuit layer 100 may include VCSEL driver circuits and other addressing circuitry for addressing the VCSELs. Other methods of interfacing an optic array and an associated circuitry known to those with skill in the art are equally suitable.

To minimize light dispersion in the array, top substrate 1 and bottom substrate 2 may be aligned. Several methods of aligning numerous optic array-containing substrates are described herein. Other methods of aligning optic arrays not described herein are also within the scope of the invention.

Figure 3:
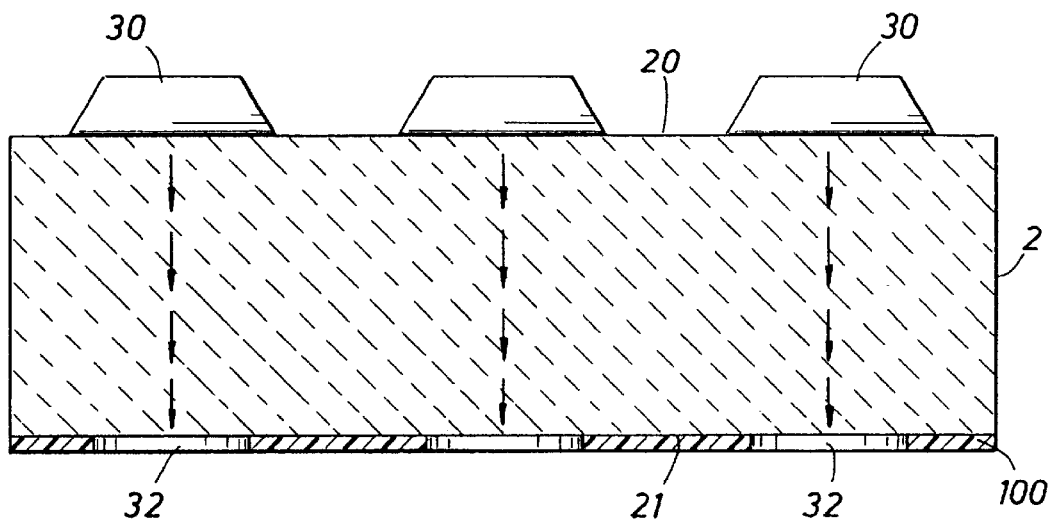
FIG. 3 shows a schematic cross-section view of an embodiment of the invention of a multi-level waveguide.

FIGS. 3–6 show representative cross-sections of optical array substrates such as substrate 2 and illustrate different embodiments of light paths through the substrate. Referring to FIG. 3, one embodiment of substrate 2 for a multi-level array is shown. At wavelengths above 1550 nanometers, substrates 2 made of certain materials, such as silicon, become transparent (transmissive) to light with little dispersion losses. If large enough light wavelengths are used, then prepared vias may not be needed as light may travel through the substrate material between the top surface 20 (as shown) and the bottom surface 21 (as shown) of the substrate. In this embodiment, there may not be any prepared vias to be aligned between substrates used with these light wavelengths, but alignment between light source 30 (e.g., a VCSEL) and light receiver 32 (such as a photodetector) may be needed for efficient interaction between the optic array and a conductive layer 100. Alignment may be achieved using markers and the alignment method described herein.

Figure 4:
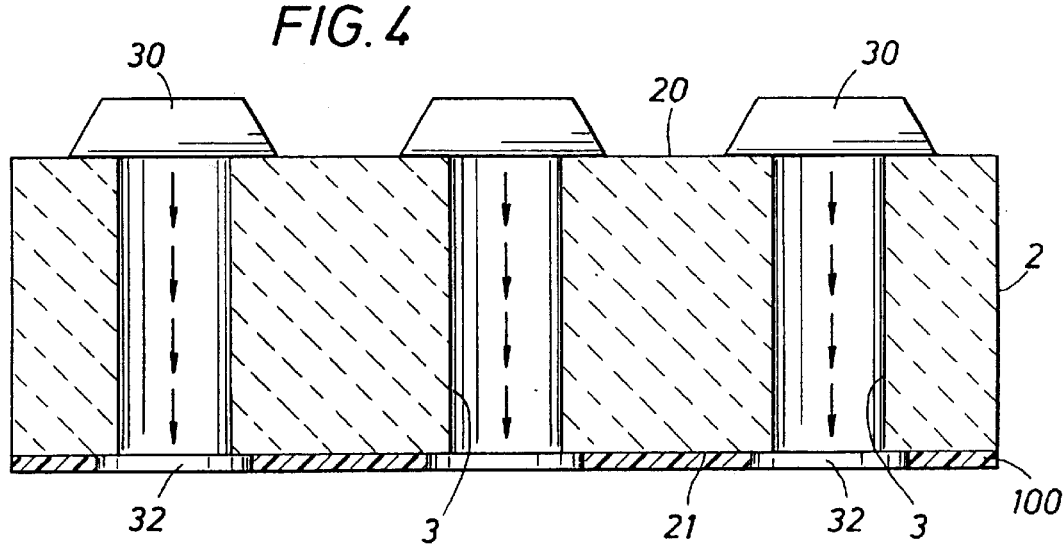
FIG. 4 shows an embodiment of the invention having a multi-level waveguide with gas filled vias.

Referring to FIG. 4, another embodiment of substrate 2 for a multi-level array is shown. While large wavelengths may be able to travel through the substrate with little dispersion losses, light with smaller wavelengths may transmit data at a faster rate. Vias may need to be cut into the substrate and prepared to minimize dispersion losses with smaller light wavelengths. In the embodiment shown in FIG. 4, vias 3 can be prepared by filling them with a gas, such as air or argon, or applying a vacuum to them after they are formed in substrate 2. Prepared vias in this embodiment of the invention may minimize dispersion losses for all wavelengths of light used, making it more practical to use wavelengths below 1550 nanometers. However, wavelengths larger than 1550 nanometers may also be used. Alignment between substrates may be necessary to reduce light dispersion losses and line up light sources and light receivers on either side of the substrates.

Figure 5:
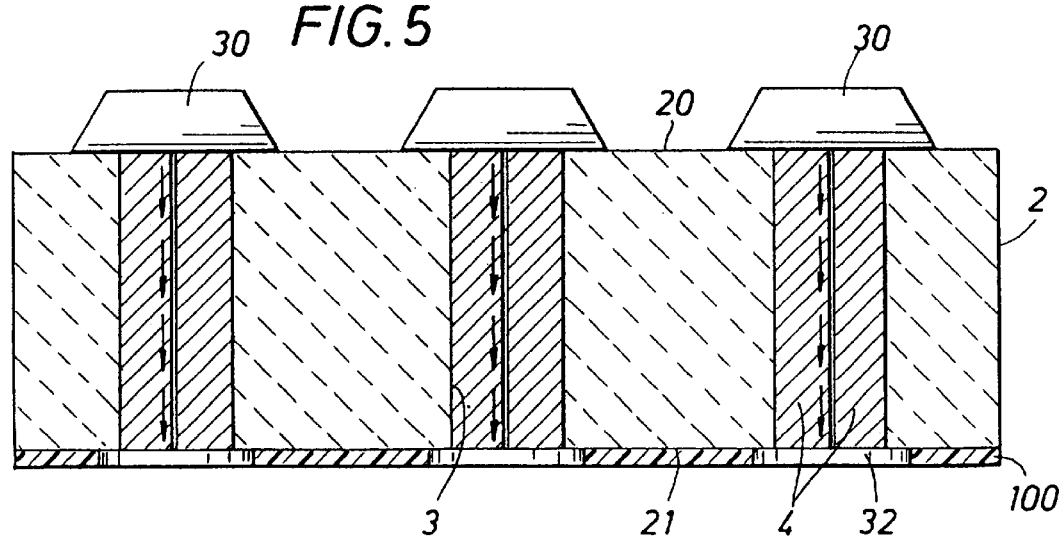
FIG. 5 shows an embodiment of the invention having a substrate for a multi-level waveguide with cladding-filled vias.

Referring to FIG. 5, another embodiment of substrate 2 for a multi-level array is shown. In this embodiment, the vias in the substrate are prepared with layers of cladding 4 along the via walls. For a semiconductor substrate, such as a silicon substrate, after vias 3 have been etched out of substrate 2, substrate 2 can be heated to thermally grow cladding layer 4 of an oxide (e.g., silicon dioxide) inside vias 3. Cladding layer 4 lines walls of vias 3 but an opening for a light transmission remains through the vias. Gas or a vacuum may, optionally, be introduced as a transmissive media.

Referring to FIG. 6, another embodiment of substrate 2 for a multi-level array is shown. In this embodiment, vias 3 in substrate 2 are prepared with cladding layers 4 grown along the via walls and a separate inner optically transmissive core material 5 introduced in the opening of each via. After vias 3 have been etched out of substrate 2, substrate 2 can be heated to thermally grow a cladding layer 4 of, for example, an oxide inside via 3. If via 3 is not too wide for cladding layer 4 to completely fill it up, then the cladding layer growth is stopped before completely filling via 3. A separate transparent material 5, such as but not limited to an oxide (e.g., silicon dioxide) or a polymer, can then be introduced such as by chemical vapor deposition (CVD) or flowing a polymer into the gap in cladding layer 4. For example, via 3 with a diameter of approximately 30 microns, may only be able to grow a 10 micron thick cladding layer 4 on its walls. The remaining gap in cladding layer 4, may be filled with a separate transparent material 5 such as a polymer.

Top surface 20 and bottom surface 21 may be planarized by, for example, chemicalmechanical polish or etching to provide planar surfaces. The difference in refraction angles between cladding layer 4 and inner transparent core material 5 may minimize dispersion losses of light traveling through inner transparent core material 5. While substrates 2 using inner transparent materials 5 may be aligned according to the location of the via walls, dispersion losses may be further minimized by aligning inner transparent core materials 5 between the substrates. Otherwise, while vias 3 may be aligned, inner transparent core materials 5 may not be centered in via 3 and light dispersion may occur between substrates.

Referring to FIG. 7, an exploded cross-sectional view of embodiment of a multi-level array is shown. In this embodiment, the multi-level array includes top substrate 1 (as shown) and bottom substrate 2 (as shown), each with an optical array, is shown prior to attaching the two substrates. Vias 3 in each substrate are first prepared by, in this example, inserting optical fiber 6 in vias of respective substrates. One way to insert optical fiber 6 in vias 3 having dimensions (e.g., diameters) on the order of the diameter of the fibers is to heat substrates to a temperature that will cause vias 3 to expand. In one embodiment, if the substrate 2 is made of silicon, the substrate may be heated in the range of approximately 75° C. to 175° C. Ends of optical fibers 6 can then be inserted into each via 3 until the end of optical fiber 6 is even with bottom surface 21. Alternately, the end of the optical fiber can be inserted past bottom surface 21. The end of the optical fiber may then be attached to a device such as a photodetector, cut (e.g., lapped/planarized) even with the bottom surface 1, or used in other ways. Typical optical fibers 6 have diameters in the range of approximately eight to ten microns with optical fiber cores 7 having diameters in the range of approximately five to six microns. If the substrates have to be heated after the addition of optical fibers, the optical fibers should not come out of the holes because the material in the optical fibers should have a greater coefficient of expansion than the substrate material. Therefore, the optical fiber should expand faster than the substrate and actually have a tighter fit as the temperature rises.

After inserting optical fibers 6, conductive interconnects, such as conductive vias terminating in terminals (contact points or contact pads) on the surface of adjacent substrates may be coupled to provide electrical communication between the substrates and, for example, an optical structure to which the substrates are collectively mounted (not shown). FIG. 7 shows terminal 8 of substrate 1 having, for example, a solder ball formed thereon, aligned with terminal 9 of substrate 2 to, when coupled, form the electrical interconnection, can be placed on substrates 1, 2 relative to optical fiber cores 7. After preparing the vias and placing terminals 9 on substrates 1 and 2, the substrates may be aligned and attached. Top substrate 1 (as shown) and bottom substrate 2 (as shown) are placed in contact with each other (ideally with the solder bumps on one substrate and metal terminals (pads) 9 on the other substrate in contact), the solder bumps on terminals 8 can be melted onto the metal terminals (pads) 9. It is appreciated that such terminals may act as conductive vias or conductive contact points for use as an alternative or additional alignment mechanism for the substrates.

Figure 8:
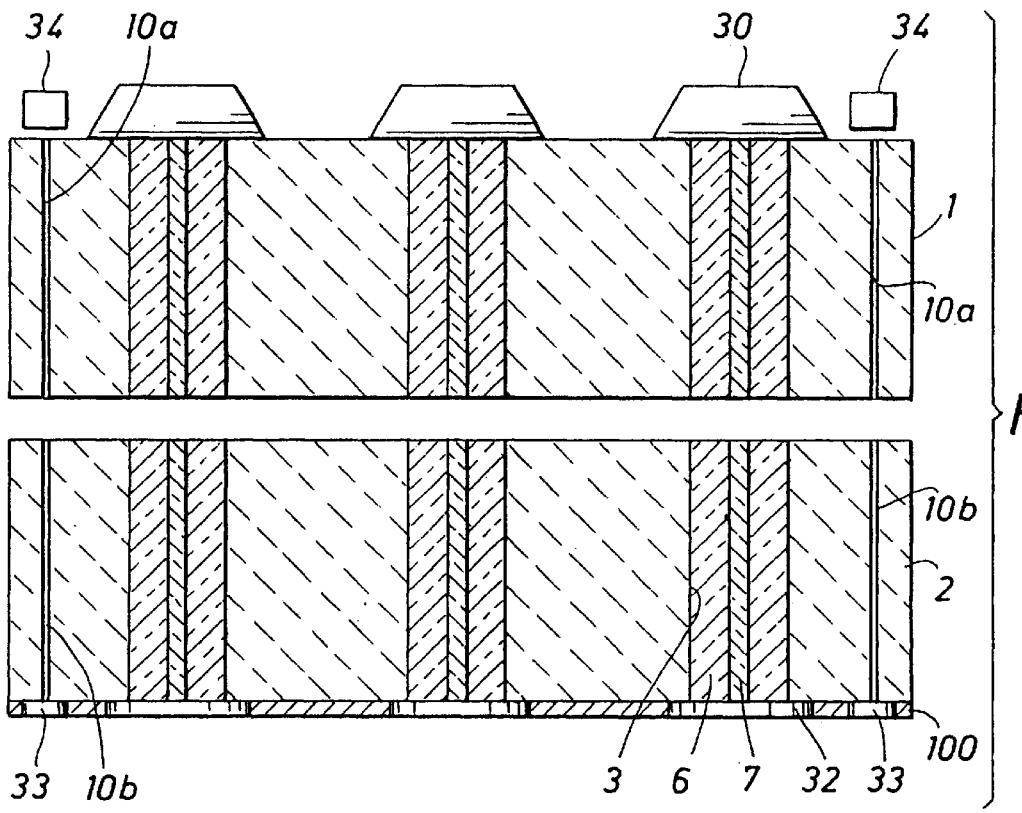
FIG. 8 shows an embodiment of the invention having two substrates of a multi-level waveguide with optical fiber and a laser/hole alignment system.

Referring to FIG. 8, another embodiment of the invention in the form of two substrates for a multi-level array (e.g., waveguide) is shown. Similar to the embodiment shown in FIG. 7, the embodiment shown in FIG. 8 also uses optical fiber 6 inserted into the top substrate 1 and the bottom substrate 2. However, instead of aligning the top substrate 1 to the bottom substrate 2, for example, metal pads, the top substrate 1 and the bottom substrate 2 are aligned by marker holes 10a and 10b placed relative to the optical fiber core. After the optical fibers have been inserted into the substrates, a source of electromagnetic radiation (such as laser 34) is radiated through marker hole 10a. A detector of electromagnetic radiation, such as a photodetector 33, is aligned with marker hole 10b. Top substrate 1 and laser 34 are moved relative to bottom substrate 2 and photodetector until marker holes 10a line up with marker holes 10b and photodetector 33 detects the laser light. Top substrate 1 and bottom substrate 2 are then attached. Alternately, laser 34 could be lined up with marker hole 10b in bottom substrate 2, and photodetector 33 could be lined up with marker hole 10a in top substrate 1. Also, alternately, marker holes 10a and 10b can be placed relative to the location of vias 3 instead of optical fiber core 7.

After the substrates have been prepared, they can be planarized and a circuit layer such as circuit layer 100 can be applied to one or more substrate if such circuit layer had not previously been applied.

Figure 9:
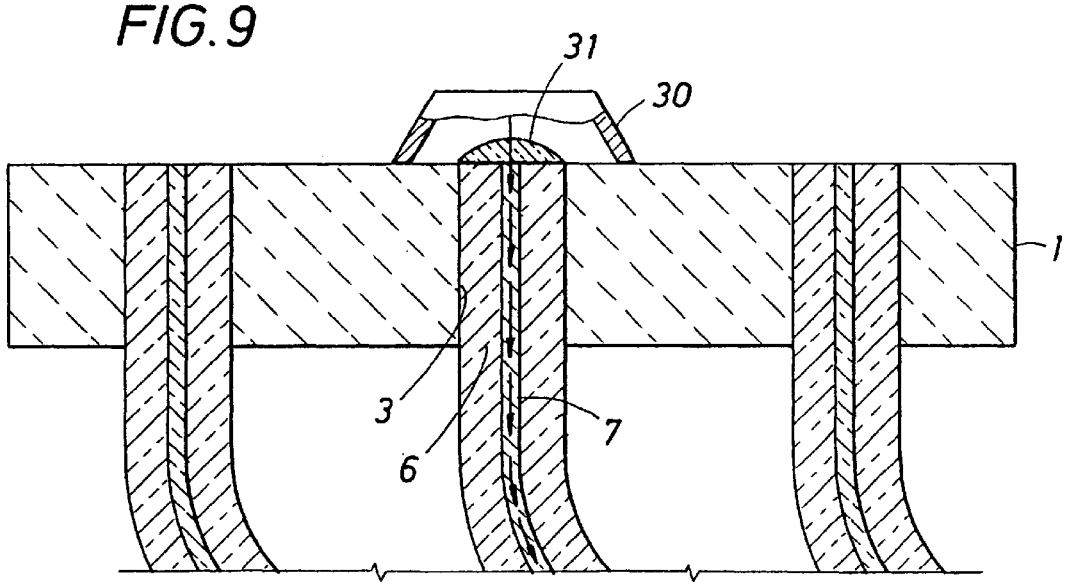
FIG. 9 shows an embodiment of the invention having a vertical cavity surface emitting laser and an annealed polymer lens.

Referring to FIG. 9, another embodiment of the invention is shown. Vertical cavity surface emitting laser (VCSEL) 30 is attached on top of top substrate 1 (as shown). Lens 31 such as a polymer lens is installed onto a via in top substrate 1 to increase the tolerable variance of misalignment between the VCSEL 30 and prepared via 3. To form lens 31 of a polymer, a polymer may be applied over the hole and then annealed.

Aligning the substrates with markers may significantly increase the speed of the processing by allowing the process to be done automatically. In addition, multi-level waveguides may be flexible to adapt to new technology and may lead to planar surfaces on MCMs incorporating optical fibers. Although an exemplary embodiment of the invention has been shown and described in the form of a multi-level waveguide, many changes, modifications, and substitutions may be made without departing from the spirit and scope of this invention.

I claim:

1. An optic array comprising:
a substrate with a plurality of holes;

at least two optical fibers each embedded in separate ones of said holes; and a lithographically defined marker disposed on said substrate relative to said separate ones of said holes.

2. The optic array of claim 1, wherein said marker is a solder bump.

3. The optic array of claim 1, wherein said marker is a metal pad.

4. The optic array of claim 1, wherein said marker is a hole in the substrate.

5. The optic array of claim 1, wherein said substrate is made of silicon.

6. The optic array of claim 1 further comprising a vertical cavity surface emitting laser aligned with said optical fiber.

7. The optic array of claim 1, wherein said marker is placed on said substrate relative to an optical fiber core.

8. A method of making an optic array comprising:

forming a plurality of holes in a substrate;

heating said substrate;

inserting at least two optical fibers each into a separate one of said holes; and placing a lithographically defined marker on said substrate relative to said separate said holes.

9. The method of claim 8, wherein said plurality of holes is formed by etching.

10. The method of claim 8, wherein said substrate is ablatable.

11. The method of claim 10, wherein said plurality of holes is formed by a laser.

12. The method of claim 8, wherein said substrate is heated between approximately 75° C. to 175° C.

13. The method of claim 8, further comprising annealing a polymer over the substrate hole.

14. The method of claim 8, wherein said marker is a solder bump.

15. The method of claim 8, wherein said marker is placed on said substrate relative to an optical fiber core.

16. The method of claim 8, further comprising stacking two or more substrates.

17. The method of claim 16, further comprising aligning said substrates by aligning said markers.

18. A method of making a multi-hip module with an optic array comprising:

etching a hole in a first substrate;

heating said first substrate;

inserting an optical fiber into said substrate hole;

placing a first marker on said first substrate;

placing a second marker on a second substrate;

lithographically aligning said first marker with said second marker; and attaching said first substrate to said second substrate.

19. The method of claim 18, further comprising annealing a polymer over the substrate hole.

20. The method of claim 18, wherein said aligning comprises:

placing a solder bump on said first substrate relative to said substrate hole;

placing a metal pad on said second substrate;

moving said first substrate and said second substrate relative to each other to contact said solder bump to said metal pad; and melting said solder bump to said metal pad.

21. The method of claim 18, wherein said aligning comprises:

placing a solder bump on said first substrate relative to a first substrate optical fiber core;

placing a metal pad on said second substrate;

moving said first substrate and said second substrate relative to each other to contact said solder bump to said metal pad; and melting said solder bump to said metal pad.

22. The method of claim 18, wherein said aligning comprises:

etching a marker hole in said first substrate relative to said first substrate hole;

etching a marker hole in said second substrate;

moving said first substrate and said second substrate relative to each other until a source of electromagnetic radiation radiates through said first substrate marker hole and said second substrate marker hole; and detecting said source of electromagnetic radiation with a detector of electromagnetic radiation.

23. The method of claim 18, wherein said aligning comprises:

etching a marker hole in said first substrate relative to a first substrate optic fiber core;

etching a marker hole in said second substrate;

moving said first substrate and said second substrate relative to each other until a source of electromagnetic radiation radiates through said first substrate marker hole and said second substrate marker hole; and detecting said source of electromagnetic radiation with a detector of electromagnetic radiation.

* * * * *

UNITED STATES PATENT AND TRADEMARK OFFICE
CERTIFICATE OF CORRECTION

PATENT NO.    : 6,633,707 B1  
DATED         : October 14, 2003  
INVENTOR(S)   : Murali It is certified that error appears in the above-identified patent and that said Letters Patent is hereby corrected as shown below:

Title page,  
Item [57], ABSTRACT,  
Line 4, delete "tan", insert -- can --.

Column 2,  
Line 57, delete "accordingly", insert -- Accordingly --.

Signed and Sealed this

Sixth Day of January, 2004

JAMES E. ROGAN  
*Director of the United States Patent and Trademark Office*